(12) United States Patent
Pchelnikov et al.

(10) Patent No.: US 6,393,912 B2
(45) Date of Patent: *May 28, 2002

(54) ELECTROMAGNETIC METHOD OF THE ANGULAR DISPLACEMENT MONITORING

(75) Inventors: Yuriy N. Pchelnikov, Cary; David S. Nyce, Apex, both of NC (US)

(73) Assignee: MTS Systems Corporation, Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,840

(22) Filed: Aug. 24, 1999

Related U.S. Application Data

(63) Continuation-in-part of application No. 09/134,056, filed on Aug. 14, 1998.

(51) Int. Cl.[7] .................... G01P 15/00; G01P 3/48; G01B 7/14; G01B 7/30
(52) U.S. Cl. ............... 73/488; 324/167; 324/207.13; 324/207.25
(58) Field of Search .............. 73/488, 504.01; 324/160, 166, 167, 207.11, 207.13, 207.14, 207.15, 207.16, 207.25

(56) References Cited

U.S. PATENT DOCUMENTS 4,410,853 A * 10/1983 Ikoma ..................... 324/167
6,163,148 A * 12/2000 Takada et al. ............ 324/226
6,169,396 B1 * 1/2001 Yokotani et al. ....... 324/207.21

* cited by examiner

Primary Examiner—Richard A. Moller
(74) Attorney, Agent, or Firm—David M. Ostfeld

(57) ABSTRACT

A method and apparatus is disclosed for monitoring an angular displacement, such as angle position and the direction of displacement. The method and apparatus includes at least one resonator placed in proximity to a electrodynamic profile and exciting within said resonator an alternating electromagnetic field. The electromagnetic field should be at a frequency at which the electromagnetic field contacts the electrodynamic profile and then variations of the electromagnetic field parameters are measured for the resonator caused by rotating the electrodynamic profile. Excitation of the resonator is by an electromagnetic field in the form of at least one slowed electromagnetic wave having a suitable energy distribution of the electric and magnetic fields for measuring the electromagnetic field parameters.

69 Claims, 19 Drawing Sheets

ELECTROMAGNETIC METHOD OF THE ANGULAR DISPLACEMENT MONITORING

CROSS-REFERENCE TO RELATED APPLICATION

This is a continuation-in-part of U.S. patent application Ser. No. 09/134,056, filed Aug. 14, 1998, by Pchelnikov et al., for Electromagnetic Method of Liquid Level Monitoring.

FIELD OF THE INVENTION

The present invention relates to the angular displacement monitoring, more specifically, to an electromagnetic method and apparatus for measuring angular position and a rotation speed of the axial parts of different mechanisms.

BACKGROUND OF THE INVENTION

The usefulness of the RF or microwave field application for angular displacement and rotation speed monitoring is recognized by the prior art. Such devices can operate with either RF or microwave excitation. When an electromagnetic field is excited near the rotating part of a mechanism, the parameters of the electromagnetic field, such as resonant frequency, phase or amplitude, vary with the change of angular position of the rotating part. The electromagnetic field parameters may be converted into angle, angular speed or rotation frequency. In particular the state of the art is shown in U.S. Pat. No. 3,939,406 "Sensing Rotational Speed by Amplitude Modulating a Continuous Microwave Signal, "/F. W. Chapman, F. E. Jamerson, and N. L. Muench, 1971, disclosing an electrodynamic sensor including two cavity resonators, one connected to a microwave generator, the other connected to microwave receiver, the two cavity resonators placed near a muff installed on the rotating part, said muff has identical slots in a cylindrical surface along generatrix and positioned periodically in the angular direction. The rotation of the slots influenced by the angular displacement of the muff, leads to a change in the electromagnetic connection between the resonators and, as a result, to the amplitude modulation of the signal passing from the microwave generator to the receiver. The modulation frequency is proportional to rotational speed.

A general discussion, see V. A. Viktorov, B. V. Lunkin and A. S. Sovlukov, "Radio-Wave measurements" [in Russian], *Moscow: Energoatomizdat,* 1989, pp.148–153, states that a microwave resonator is placed near the rotating part, which surface electrodynamic property ("electrodynamic profile") changes, in the azimuth direction and the resonator's frequency has a direct correlation to the angular position of the rotating part.

Slowed electromagnetic waves and slow-wave structures are also well known in the field of microwave engineering, see J. R. Pierce, "Traveling-Wave Tubes" D. Van Nostrand Company, Inc., Princeton, N.J., 1950. These waves are electromagnetic waves propagating in one direction with a phase velocity $v_p$ that is smaller than the light velocity c in a vacuum. The relation $c/v_p$ is named slowing or deceleration and is designated as n. In the most practically interesting cases, slowed electromagnetic waves are formed in slow-wave structures by coiling one or two conductors, for example, into a helix, or radial spiral (prior art), which increases the path length traveled by the wave. The curled conductor is named "impedance conductor," the other is named "screen conductor." Additional deceleration was also obtained due to positive electric and magnetic coupling in coupled slow-wave structures, which both conductors are coiled and have configuration of mirror images turned by 180° relatively to the plane of symmetry, see Yu. N. Pchelnikov, "Comparative Evaluation of the Attenuation in Microwave Elements Based on a Spiral Slow-Wave System," *Soviet Journal of Communication Technology and Electronics,* Vol 32, #11, 1987, pp. 74–78.

The slow-wave structure-based sensitive elements are known in the art, see V. V. Annenkov, Yu. N. Pchelnikov "Sensitive Elements Based on Slow-Wave Structures" *Measurement Techniques,* Vol. 38, #12, 1995, pp. 1369–1375. The slowing of the electromagnetic wave leads to a reduction in the resonant dimensions of the sensitive elements and this enables one, by using the advantages of electrodynamic structures, to operate at relatively low frequencies, which are more convenient for generation and are more convenient for primary conversion of the information signal, but sufficiently large to provide high accuracy and high speed of response. The low electromagnetic losses at relatively low frequencies (a few to tens of megahertz) also helps to increase the accuracy and sensitivity of the measurements. The slowing of the electromagnetic wave leads also to energy concentration in the transverse and longitudinal directions, that results in an increase in sensitivity, proportional to the slowing down factor n, see Yu. N. Pchelnikov, "Nontraditional Application of Surface Electromagnetic Waves" Abstract Book, First World Congress on Microwave Processing, 1997, pp. 152–153.

Both the prior art and the present invention measure one or more parameters of electromagnetic field. Some of the prior art methods and present invention use one or two resonators, placed near the rotating part, having an "electrodynamic profile." The resonators are connected to a measuring circuit comprising an RF or microwave signal generator which is used to excite an electromagnetic field. The change in rotating part position causes a shift in the characteristics of the electromagnetic field in the resonators. See V. A. Viktorov, B. V. Lunkin and A. S. Sovlukov, "Radio-Wave measurements" [in Russian], *Moscow: Energoatomizdat,* 1989, pp.

Devices used in the prior art exhibit several problems overcome by the present invention. Previous methods have low accuracy, sensitivity, and resolution at relatively low frequency, increasing only with frequency increase. However, the increase in frequency is accompanied by an increase in electromagnetic losses, such losses causing a loss of accuracy of the measurement. It is also known that the higher the frequency is, the higher the cost of electronics. The previous methods do not yield the direction of the rotation, and require complex and expensive equipment. Thus, there is a need in the art for an electromagnetic method and apparatus for monitoring rotation that has greater sensitivity, resolution, diversity and lower cost.

SUMMARY OF THE INVENTION

The present invention employs a slow-wave structure as a part of a resonator sensitive to position of the rotating surface, parameters of the electromagnetic field in the resonator being informative parameters of position, velocity and the like. The main advantages of such sensitive elements, in comparison to known ones, are: relatively low frequency, concentration of electromagnetic energy in a small volume, the independence of their electrodynamic parameters upon the electronic circuit parameters.

Frequency decrease is achieved due to slowing. Sensitivity increase is achieved due to electromagnetic energy concentration near the rotating surface and due to shifting the electric or magnetic field in the region between the resonator and rotating surface having special electrodynamic profile changing along the azimuth direction. The direction of rotating is obtained due to using non-symmetrical electrodynamic profile, or due to using of two identical resonators placed with angular shift one to another, and comparing electromagnetic parameters of both resonators. The simplicity and inexpensive construction are due to relatively low frequency which allows the printed-circuit processing application. The high accuracy and resolution are due to the resonators' design: the slow-wave structure-based resonators are made, as a rule, on dielectric base, stable to temperature alteration and its electromagnetic parameters dependence on temperature is very small, contrary to, for example, cavity resonators.

The present invention teaches an electromagnetic method of measuring the position of rotating surface, rotation speed and its direction or other measurements that require high resolution wherein: an excited electromagnetic wave with a preset distribution of the electric and magnetic components of the electromagnetic field makes it possible to increase the sensitivity and accuracy of measurement, using relatively low frequencies. The method is implemented in an apparatus, for example, encoders, wherein: the structural form of the resonators, used as the sensing element and the electrodynamic profile of the rotating part allow increased sensitivity and accuracy. In the invention resonators include at least one section of a slow-wave structure sensitive to the electromagnetic parameters of the electrodynamic profile rotating with a monitored part.

It is known, that the dielectric or conducting materials, placed in the electromagnetic field, alter its parameters, for example, its velocity, that leads to the phase delay or resonant frequency alteration. The influence of dielectric, conducting, and magnetic material differs and depends on electric and magnetic fields distribution in the monitored volume, see V. A. Viktorov, B. V. Lunkin and A. S. Sovlukov, "Radio-Wave measurements" [in Russian], *Moscow: Energoatomizdat,* 1989, pp. 148–153. Application of slow-wave structures makes it possible to alter electric and magnetic field distribution in the transverse and in the longitudinal directions both, including the electric and magnetic fields splitting. It leads, from one hand, to the sensitivity increasing, and, from the other hand, to electromagnetic field parameters dependence on electromagnetic parameters of conducting or non-conducting objects being in the field of a slow-wave structure-based resonator.

DESCRIPTIONS OF THE DRAWINGS

For further understanding of the nature and objects of the present invention, reference should be had to the following figures in which like parts are given like reference numerals and wherein.

Figure 33:
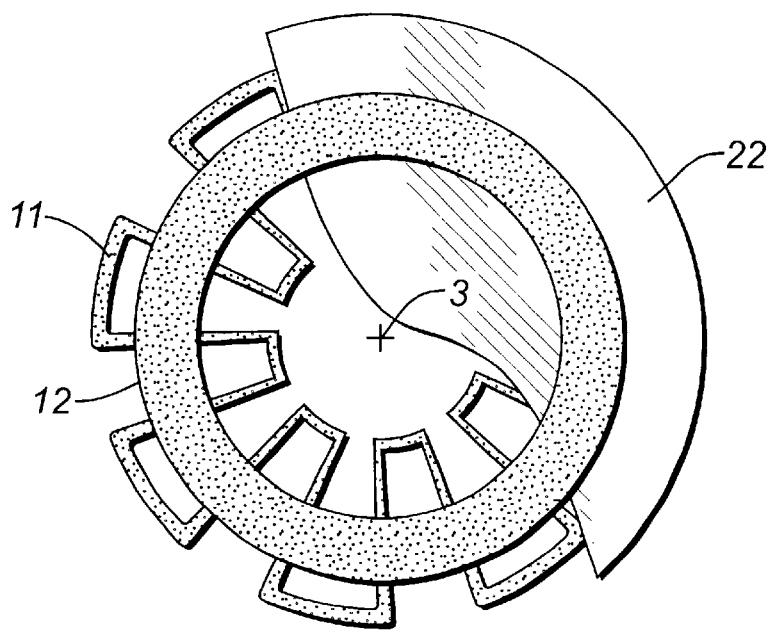
Figure 34:
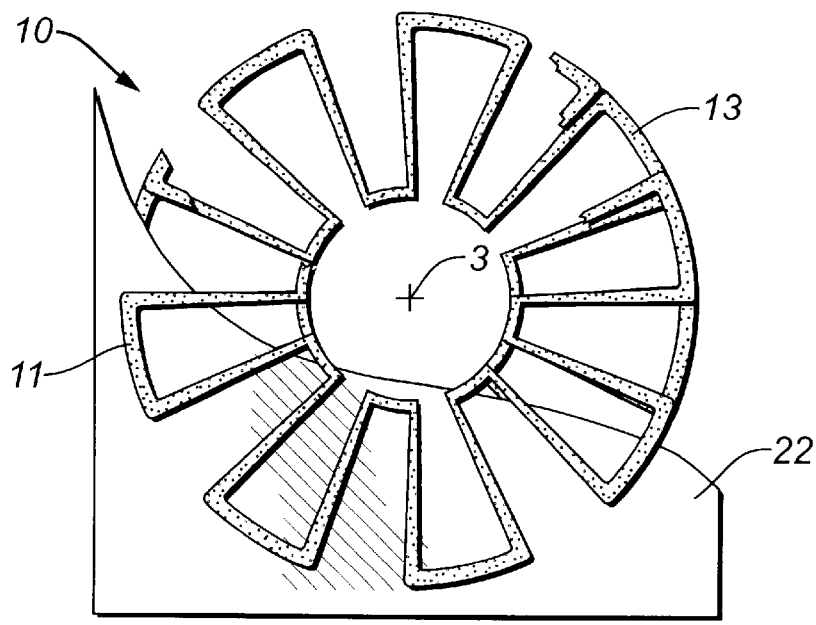
Figure 35:
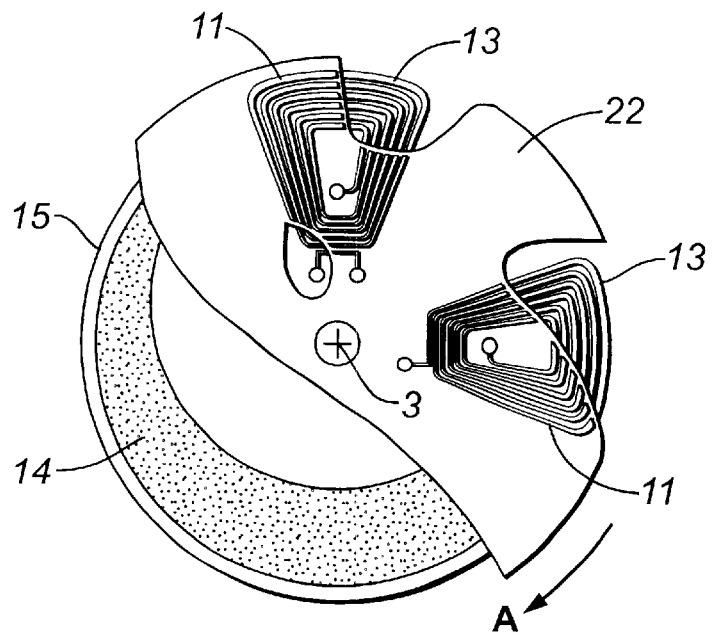
Figure 36:
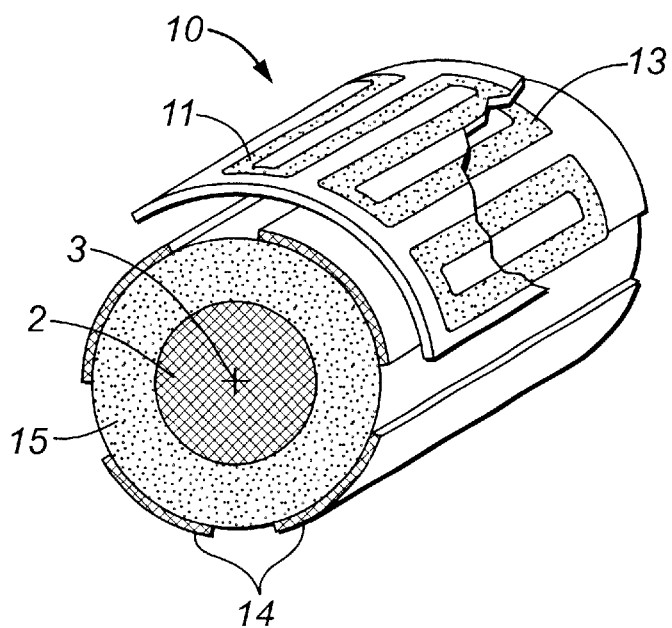
Figure 37:
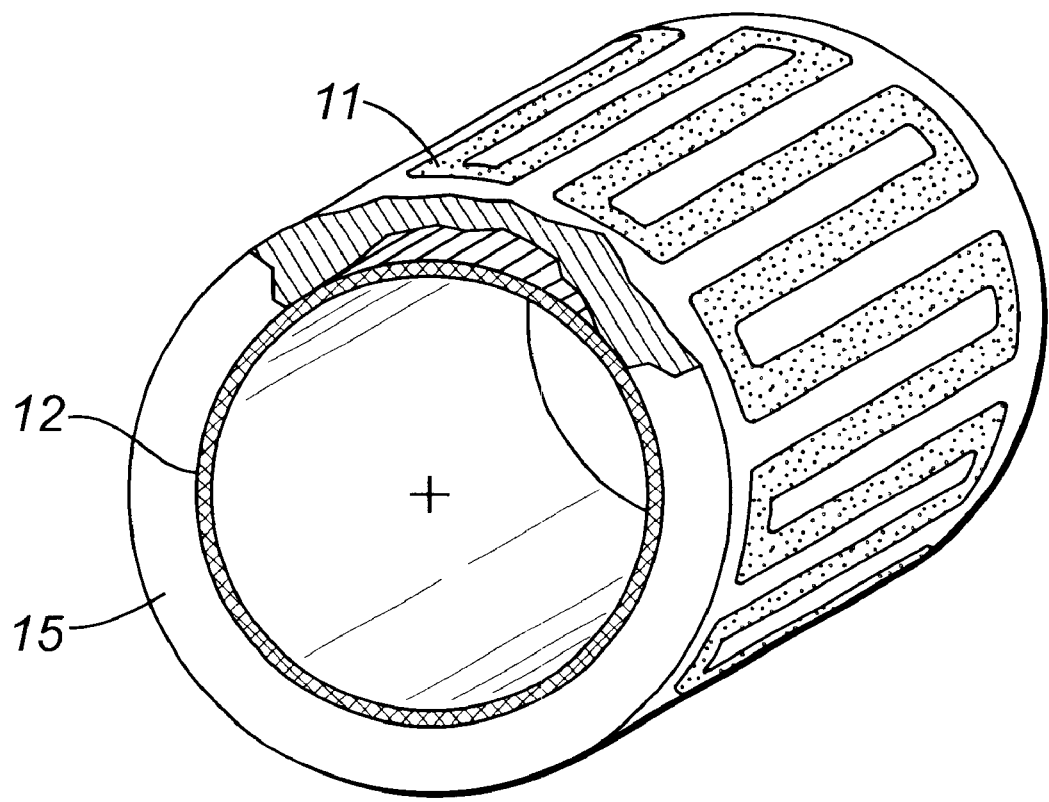

FIG. 33 demonstrates a multi-pole formed by meander line and a tape, both curled into rings;

FIG. 34 illustrates a multi-pole formed by coupled meander lines curled into rings;

FIG. 35 illustrates the preferred embodiment of the present invention in which the multi-pole is formed by coupled radial spirals with the sector form;

FIG. 36 illustrate a multi-pole in a form of a segment on a cylindrical surface;

FIG. 37 illustrates a multi-pole in the form of a closed ring on the cylindrical surface.

DETAILED DESCRIPTION OF THE PREFERRED EMBODIMENTS

Figure 1:
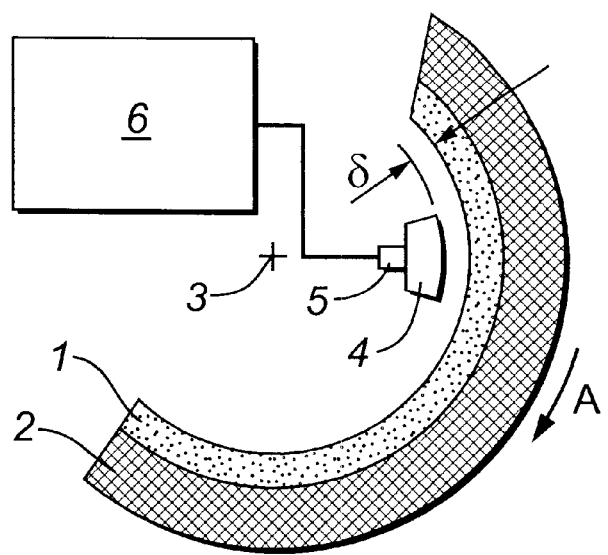
FIG. 1 illustrates a preferred embodiment of the present invention in which a resonator is placed inside a rotating part.
Figure 2:
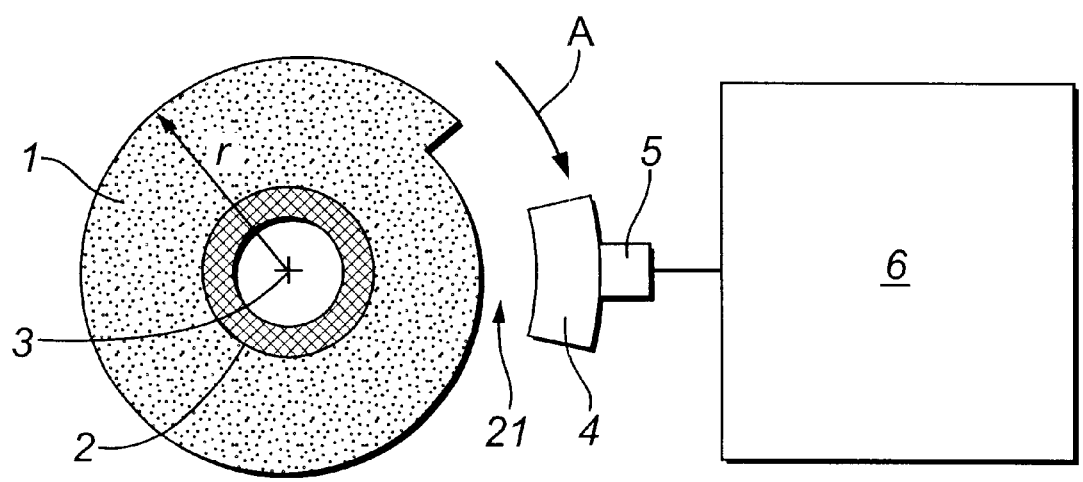
FIG. 2 illustrates a preferred embodiment of the present invention in which a resonator is placed outside a rotating part.
Figure 3:
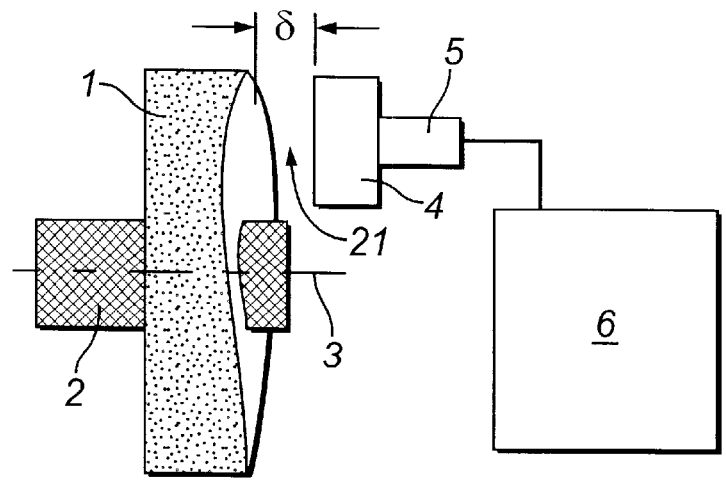
FIG. 3 illustrates a preferred embodiment of the present invention in which a resonator is placed from the side of a rotating part.
Figure 4:
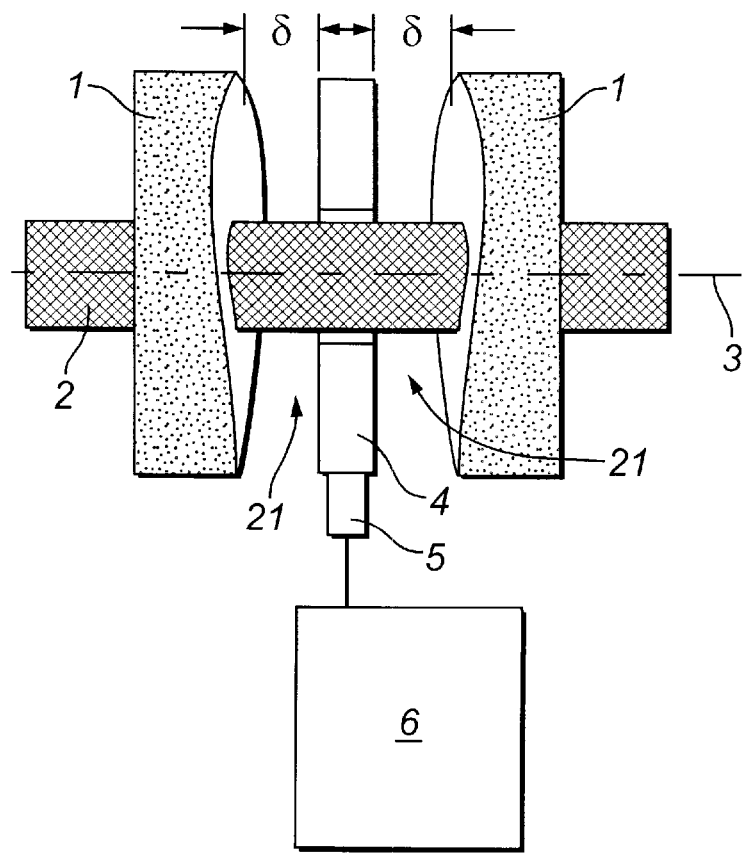
FIG. 4 illustrates a preferred embodiment of the present invention in which a resonator is placed between electrodynamic profiles.

As shown in FIGS. 1–3, an electrodynamic profile 1 may be mounted on the rotating part 2 inside (FIG. 1), outside (FIG. 2), or from the side (FIG. 3) of the rotating part 2, said rotating part 2 having stationary axis 3 of rotation. It can be two electrodynamic profiles 1, mounted from both sides of the resonator 4 (FIG. 4). The arrow A in figures lies in the rotation plane. In parallel to the electrodynamic profile 1 a resonator 4 is mounted on a stationary base (not shown in figures). The resonator 4 includes a matching plug 5 through which it is connected to the measuring circuit 6. Circuit 6 comprises (FIG. 5) a generator 7 of electromagnetic oscillations at microwave or RF frequency, primary transducer 8, converting the electromagnetic parameters of the resonator 4 into an electromagnetic informative signal, for example, frequency of the generator 7, and converter 9, converting electromagnetic informative signals into information about the part 2 angular position, angular velocity, etc.

Figure 6:
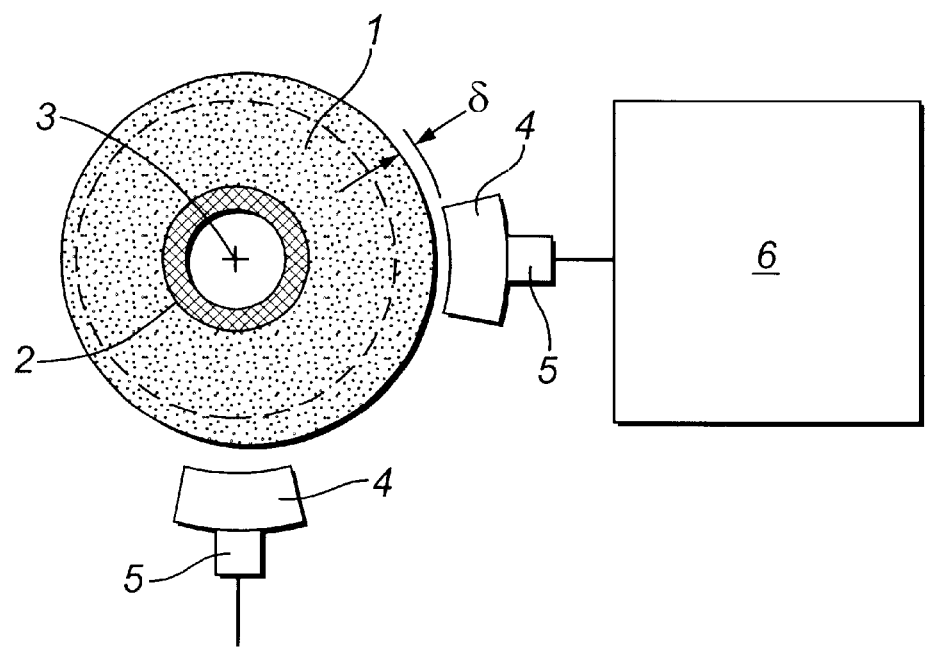
FIG. 6 illustrates a preferred embodiment of the present invention in which two resonators are installed outside an electrodynamic profile.

Two or more identical resonators 4 may be placed in parallel to electrodynamic profile 1 in the same rotational plane and at the same distance from the rotation axis 3 (FIG. 6). Each of resonators 4 can be connected to the identical measuring circuits 6 or to one measuring circuit 6 (not shown in figures), which generator 7 is a sweep generator or noise generator, see Author's Certificate #1049795 (USSR),/ Pchelnikov et al.//Published in B. I. #39, 1983.

At least one slowed electromagnetic wave is exited in the resonator 4 at a frequency at which the electromagnetic field penetrates into electrodynamic profile 1. This means that the distance δ between electrodynamic profile 1 and resonator 4 should not exceed the so called "thickness of the energy concentration" which is approximately equal to $\lambda/2\pi n$, where λ is the said slowed wave wavelength in a vacuum, n is a slowing of said wave, defined by relation $$n=c/v_p.$$

Here c is the light velocity in a vacuum, $v_p$ is a phase velocity of a slowed wave.

Figure 7:
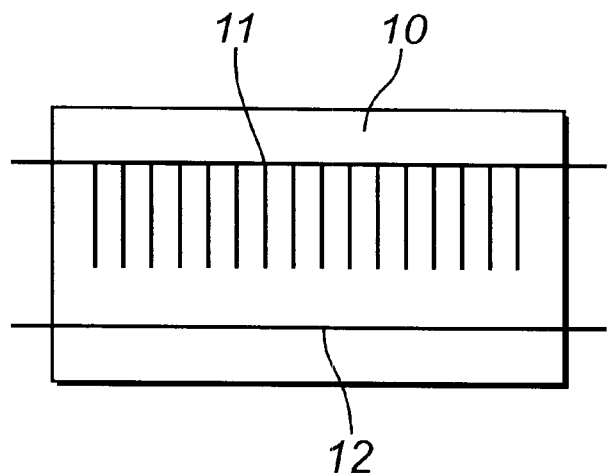
FIG. 7 illustrates a two-conductor slow-wave structure scheme of prior art.
Figure 8:
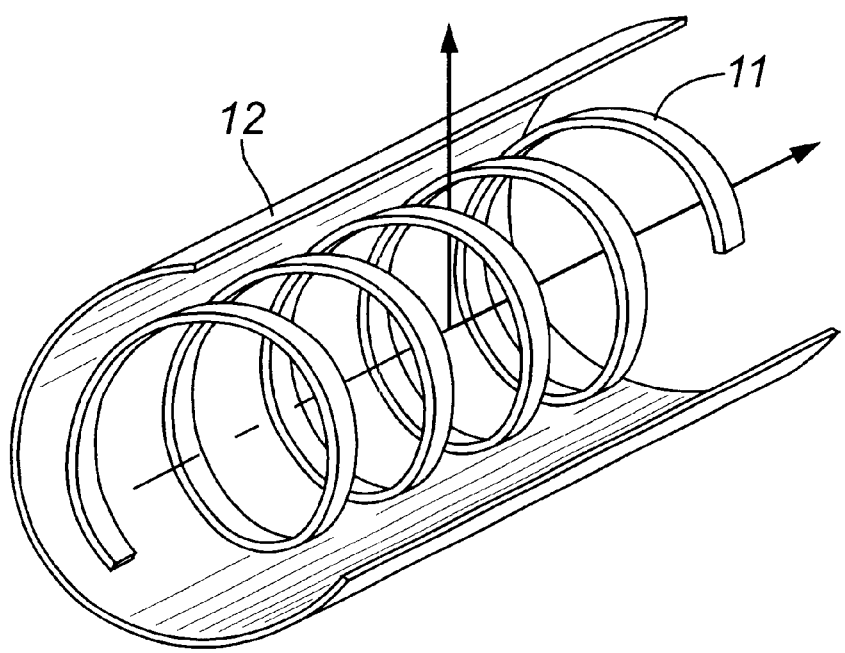
FIG. 8 illustrates a helical slow-wave structure of prior art.
Figure 9:
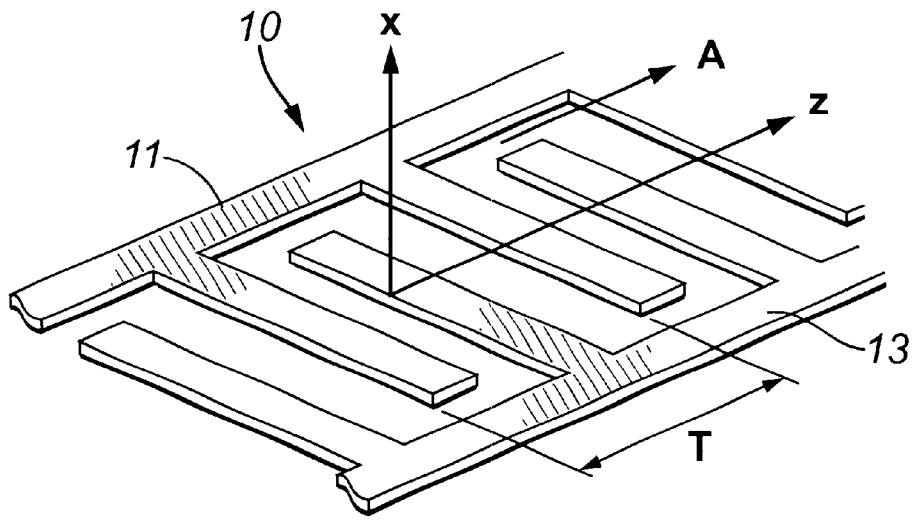
FIG. 9 illustrates an interdigital combs of prior art.

The slowed electromagnetic wave can be formed by so called slow-wave structure, see Dean A. Watkins "Topics in Electromagnetic Theory," John Willy & Sons, Inc. Publishers). Two-conductor slow-wave structures (FIG. 7) are preferably used the most though three-conductor slow-wave structures can be used also, see V. V. Annenkov, Yu. N. Pchelnikov "Sensitive Elements Based on Slow-Wave Structures" *Measurement Techniques,* Vol. 38, #12, 1995, pp. 1369–1375. One of the slow-wave structure 10 conductors is a so called "impedance conductor" 11, the other is a screen conductor 12. For example, in a helical slow-wave structure (see L. N. Loshakov, Yu. N. Pchelnikov "Traveling Wave Tube Theory and Amplification Calculation" *Moscow: Radio,* 1964.) a helix is an impedance conductor 11, a metal cylinder is a screen conductor 12 (FIG. 8). Both conductors of slow-wave structures could be impedance conductors 11, 13, for example in the case of an interdigital combs, shown in FIG. 9. Thus, a slow-wave structure may be quadripole, hexapole, or multi-pole. It can be connected to a measuring circuit by both its ends or from one end only as a dipole, three-pole, etc.

In the present invention the part of resonator 4 facing the electrodynamic profile 1, and sensitive to its rotation is formed by slow-wave structure 10, which is called in future "multipole."

The electrodynamic profile 1 is characterized by changing of, in the azimuth direction (arrow A), at least one of its electromagnetic parameter (conductivity, permittivity, or permeability), or changing its dimensions. The simplest way to change electromagnetic property of the electrodynamic profile 1 which influence the electromagnetic field in the resonator 4 is to change radius r of the electrodynamic profile 1 or its width w, as shown in FIGS. 2 and 3, respectively.

Figure 10:
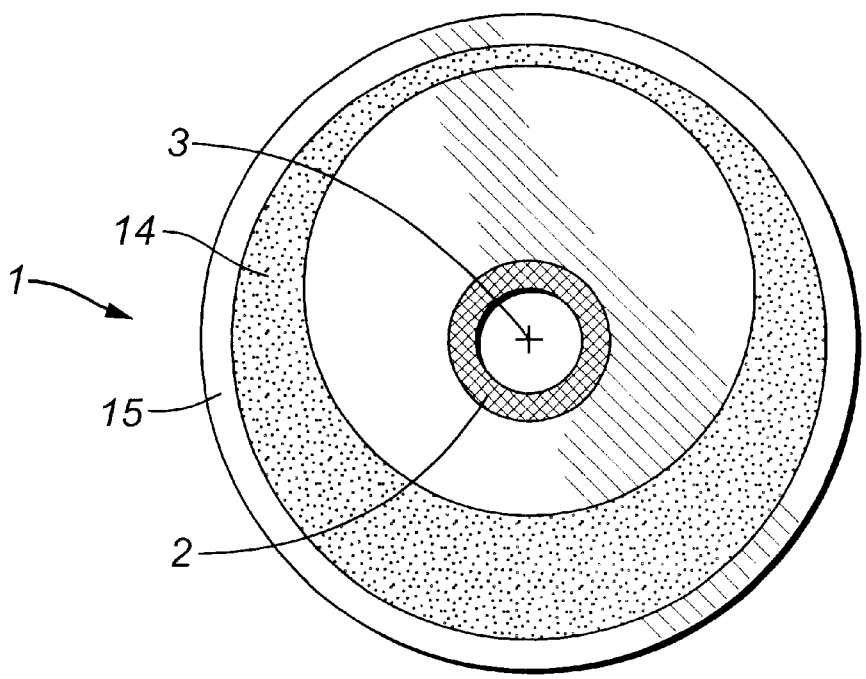
FIG. 10 illustrates a preferred embodiment of the present invention in which an electrodynamic profile is made as a metal ring with a changing width installed on a dielectric body.
Figure 11:
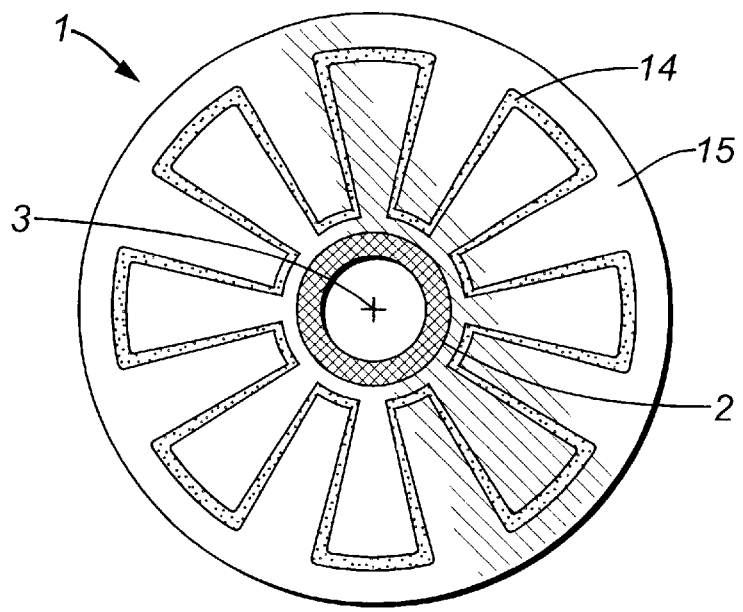
FIG. 11 illustrates a preferred embodiment of the present invention in which an electrodynamic profile is made as a metal ring with a configuration of a meander line installed on a dielectric body.
Figure 12:
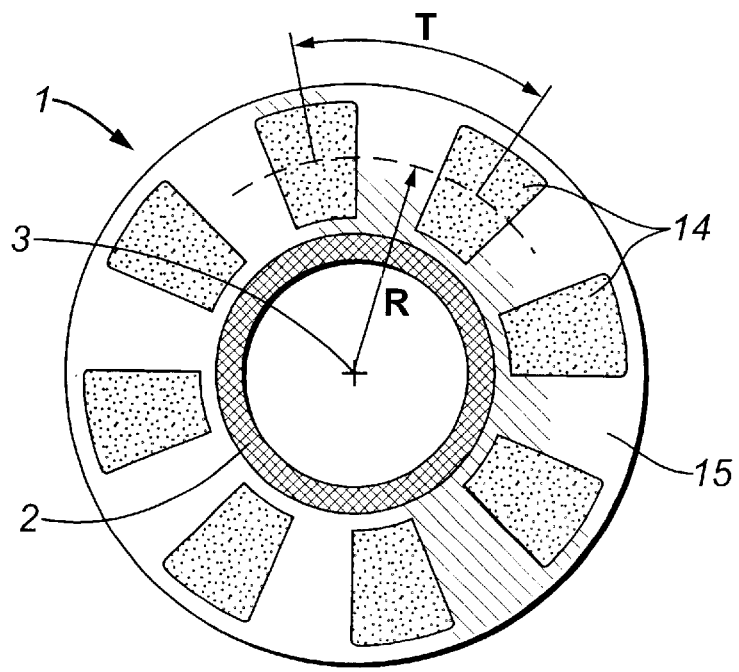
FIG. 12 illustrates a preferred embodiment of the present invention in which an electrodynamic profile is made as a row of metal members installed on a dielectric body.

In most cases it is more convenient to change electromagnetic property by changing a configuration of metal coating 14 on the dielectric body 15 of the electrodynamic profile 1 (FIGS. 10–12). The metal coating 14 may form a solid ring with changing in the azimuth direction width, as shown in FIG. 10, or form a periodic row of conducting members connected one to another (FIG. 11), or not connected (FIG. 12). In most cases the metal coating 14 faces the sensitive part of the resonator 4 the multi-pole 10.

The electromagnetic parameters of the electrodynamic profile 1 facing the multipole 10 influence on the electromagnetic field in the resonator 4 that leads to its electromagnetic parameters changing, for example, the resonant frequency $f_r$. The electrodynamic profile 1 angular position alteration leads to electromagnetic parameters alteration also.

Figure 13:
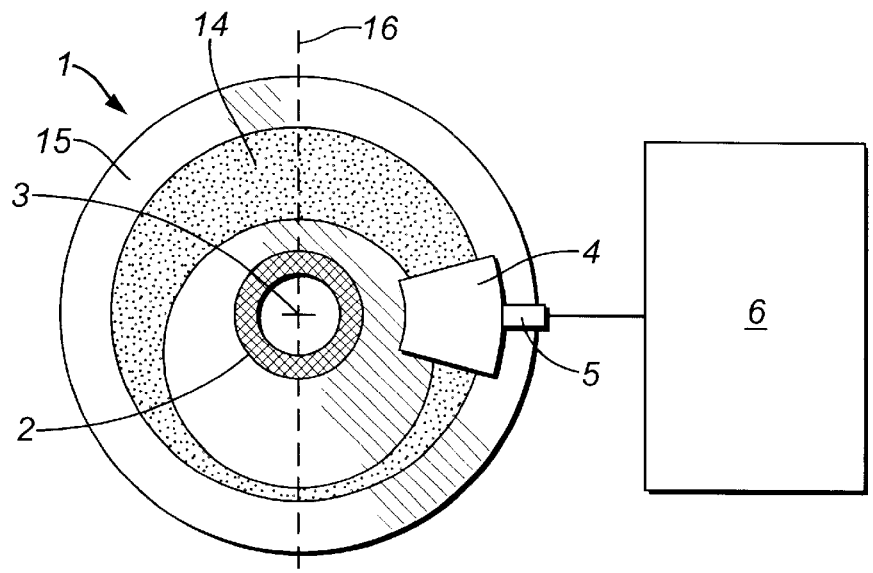
FIG. 13 illustrates a preferred embodiment of the present invention in which one resonator is used for scalar monitoring of an angular displacement.

In the case of a scalar monitoring, when the displacement direction should not be measured) the electromagnetic property of the profile 1 may change symmetrically relative to one axis in the rotation plane (axis 16), and one resonator 4 can be used, as shown in FIG. 13. In this case the displacement to be measured may not exceed (180°−α/2), where α is the angular dimension of the resonator 4.

Figure 14:
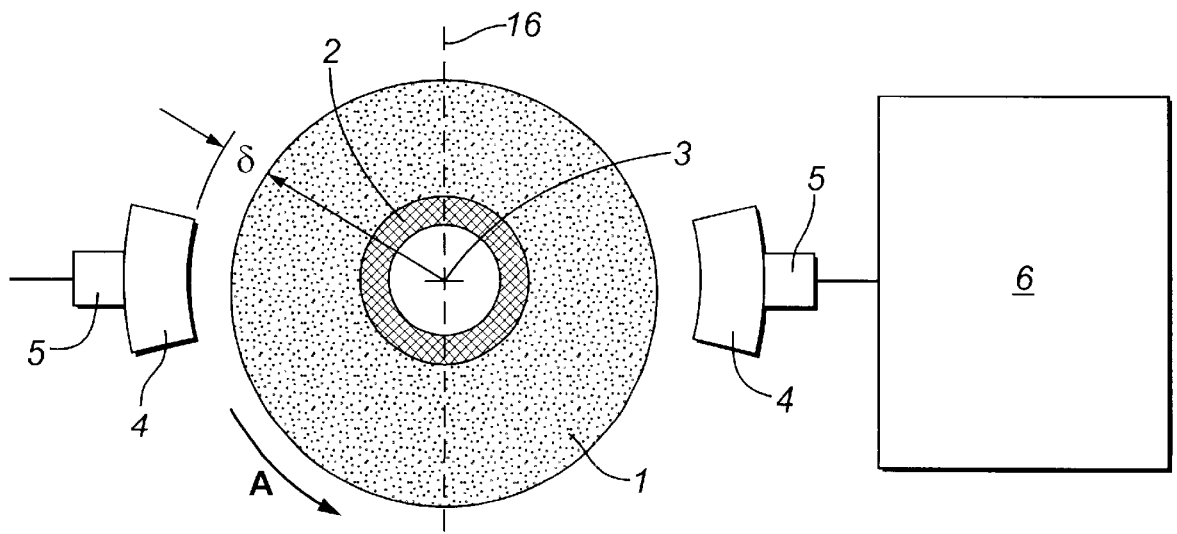
FIG. 14 illustrates a preferred embodiment of the present invention in which two resonators are placed diametrically opposite to the rotation axis.

The accuracy of the scalar monitoring can be increased by the using of two resonators 4 placed diametrically opposed relative to the axis 3 (FIG. 14). In this case the measured electromagnetic parameters of resonators 4 can be summed to eliminate the error caused by mechanical errors, for example, by the profile 1 vibration.

Figure 15:
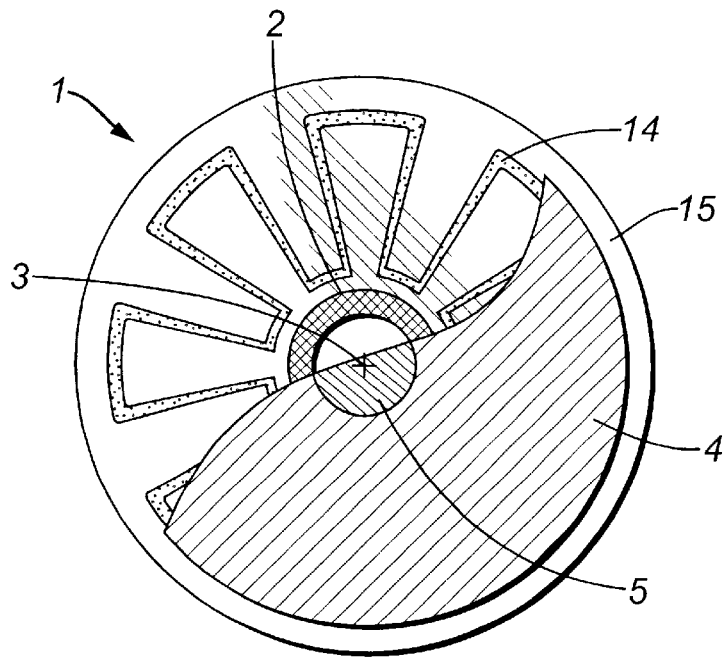
FIG. 15 illustrates a preferred embodiment of the present invention in which one resonator is used for a small angular displacement monitoring.

If a relatively small angular displacement φ is to be monitored, the preferable sensitivity can be achieved by using a periodic metal coating 14. In this case the resonator 4 faces the whole area of coating 14 (FIG. 15).

Figure 16:
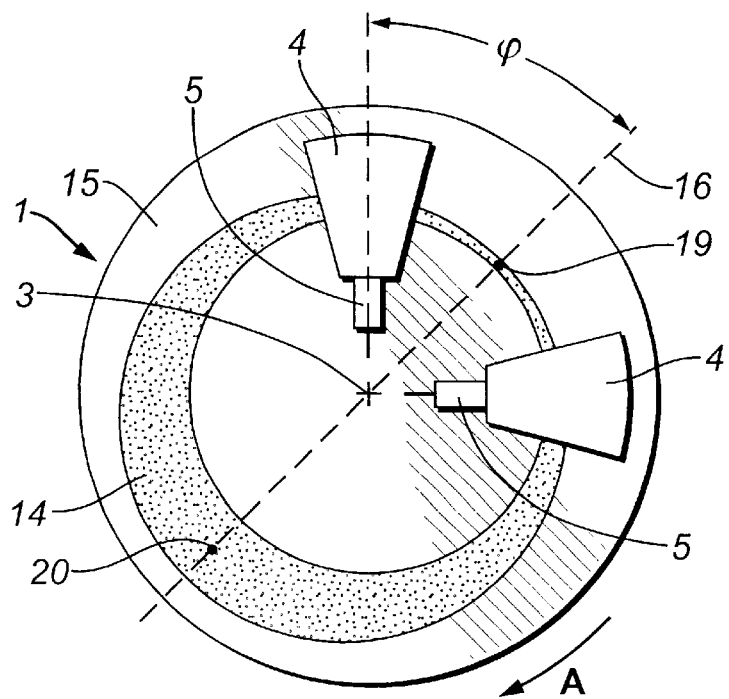
FIG. 16 illustrates a preferred embodiment of the present invention in which two resonators are placed with 90° shift from the side of the symmetrical electrodynamic profile.
Figure 17:
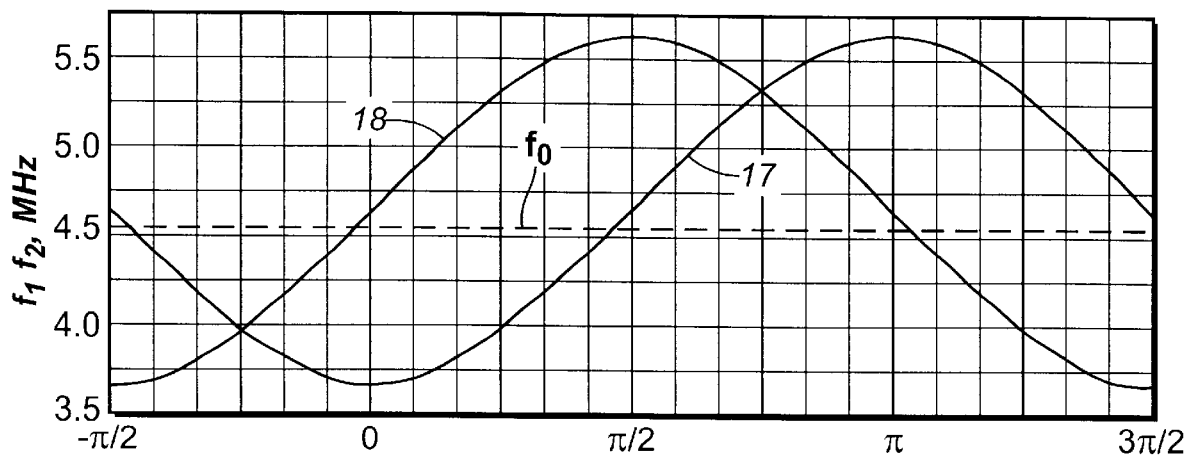
FIG. 17 illustrates the resonance frequencies of the resonators in FIG. 16.

Two resonators 4 placed with an angular shift, for example 90° (FIG. 16), make it possible to monitor not only an angular displacement value but also the displacement direction. Comparing a dependence, for example, of the resonant frequency $f_1$ (curve 17 in FIG. 17) of the vertically placed resonator 4, and a dependence of the resonant frequency $f_2$ (curve 18 in FIG. 17) of the horizontally placed resonator 4 upon angular displacement φ relative to vertical, one can find an angular position of the profile 1 and a rotation direction. Indeed, the curves 17 and 18 are shifted one relative to another on 90° that makes it possible to define the electrodynamic profile 1 position by calculating the average frequency $(f_1+f_2)/2$ and comparing this value with frequency $f_0$ that corresponds to such position of the coating 14 when the point 19 at the narrowest part of the coating 14 and point 20 at the widest its part are equally removed from the considered resonators 4.

Figure 18:
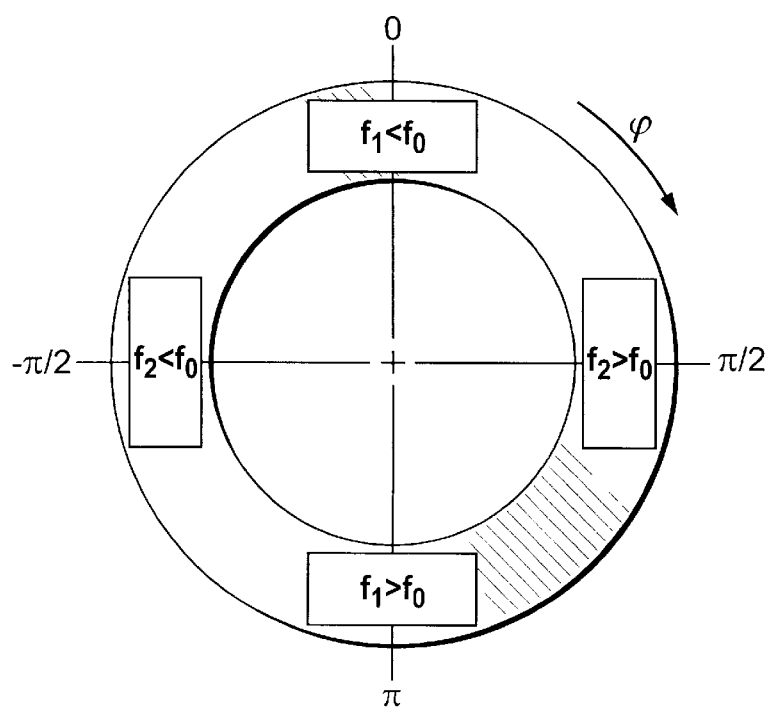
FIG. 18 shows the relations between the average frequency and frequencies of vertically and horizontally placed resonators.

Let us consider the angle φ=0 when the axis 16 is vertically oriented and the point 19 of the metal coating 14 faces the middle of the vertically placed resonator 4. If the width of the coating 14 increases the resonance frequency of resonator 4 also increases. This is demonstrated by curves 17 and 18 in FIG. 17. It is shown also in FIG. 18 that the point 19 is in the upper part of the circle ($-\pi/2<\phi<\pi/2$) if $$f_1<f_0,$$

and is in the lower part of the circle ($\pi/2<\phi<3\pi/2$) if $$f_1>f_0;$$

the point 19 is in the right part of the circle ($0<\phi<\pi$) if $$f_2>f_0,$$

and in the left part of the circle if $$f_2<f_0.$$

The frequency $f_1$ decreasing while point 19 lays in the left part of the circle means the clockwise rotation, the frequency $f_1$ increasing while point 19 lays in the right part of the circle means the clockwise rotation also.

Four resonators 4 placed with 90° shift one to another make it possible to increase accuracy, similar to that shown in the case of a scalar measurement with help of two resonators 4 placed diametrically opposite.

The angular position and direction of rotation can be measured by using of one resonator 4 only. In this case the electromagnetic property of the profile 1 should be changed monotonously (increases or decreases only) for the most part of the profile, for example as shown in FIG. 2, where the radius r of the profile 1 alters monotonously from its maximum to its minimum value and after has a discontinious change or jump to its maximum value. If the profile 1 has a dielectric property, the radius r increasing is followed by the resonant frequency of the resonator 4 decreasing. Thus, in the case shown in FIG. 2, a monotonous frequency increasing means rotating in the arrow A direction.

Alteration of each resonator 4 electromagnetic parameters, for example resonant frequency, caused by angular displacement of the profile 1, can be converted by the measuring circuit 6 to the position of rotating part 2 in the real time. Comparing of said positions allows calculation of the angular velocity, direction of rotation, and number of revolutions made by part 2.

Figure 19:
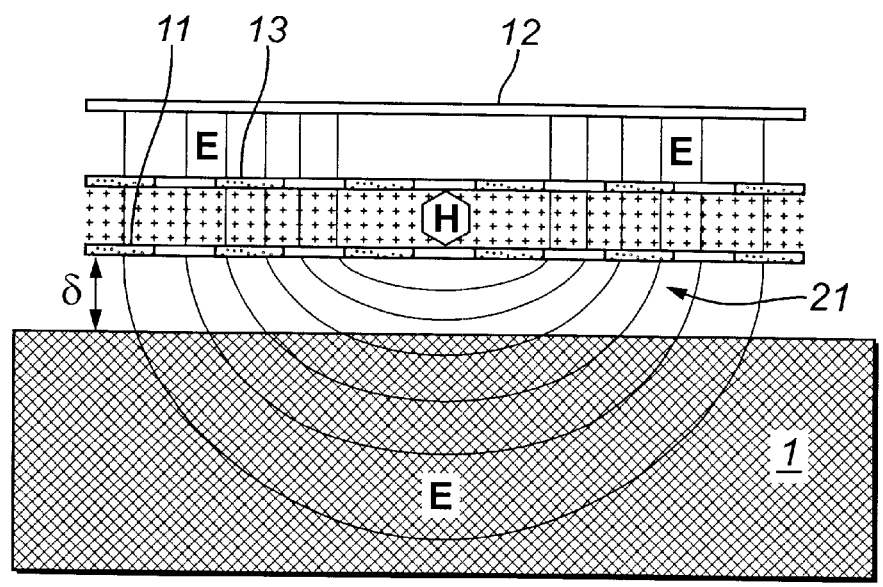
FIG. 19 illustrates an electric and magnetic fields distribution for in-phase type wave in the resonator of the preferred embodiment of the present invention.
Figure 20:
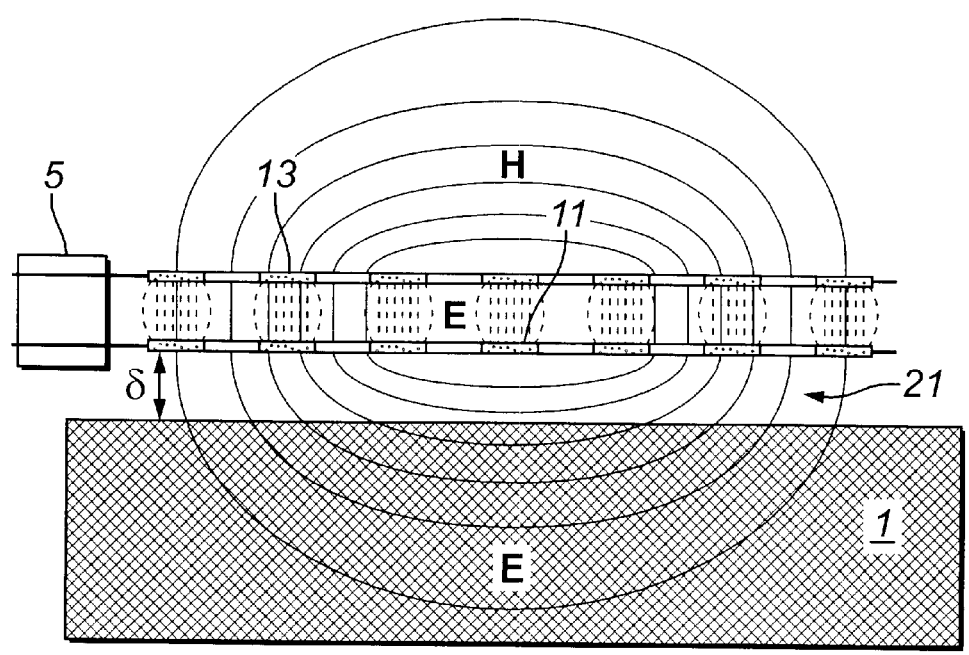
FIG. 20 illustrates an electric and magnetic fields distribution for anti-phase type wave in the resonator of the preferred embodiment of the present invention.

The slowed electromagnetic wave in the sensitive slow-wave structure 10 can be excited with electric or magnetic field shifted in the region 21 between resonator 4 and electrodynamic profile 1 (FIGS. 19, 20,). In the first case the profile 1 having dielectric property or conducting property increases slowing n of the slowed wave, in the second case, the profile 1 having conducting property decreases the slowing n. The electrodynamic profile influence change (distance, width, conductivity, etc. change) leads to the slowing n change, and, as a result, also to resonance frequency of the resonator 4 change.

The electric field shifting in the region 21 can be achieved by the in-phase slowed wave excitation in the multi-pole 10 (FIG. 19), the magnetic field shifting can be achieved by the anti-phase slowed wave excitation (FIG. 20). The electric field shifting means that the electric-field energy is presented predominately in the monitored region (region 21 in the invention), the magnetic field shifting means that the magnetic-field energy exceeds the electric field energy in region 21, see V. V. Annenkov, Yu. N. Pchelnikov "Sensitive Elements Based on Slow-Wave Structures" *Measurement Techniques,* Vol. 38, #12, 1995, pp. 1369–1375.

If the electromagnetic properties of the element 1 are represented by the metal coating 14 and the distance δ between this coating and the resonator 4 can be made relatively small, the sensitivity can be increased by the presentation of the slowed wave field in the region 21 by the first minus and plus space harmonics. For example, the magnetic field in a meander line and the electric field in interdigital combs are presented by first space harmonics, see Yu. N. Pchelinikov, V. T. Sviridov, "Microwave Electronics" [in Russian], *Moscow: Radio i Svjaz,* 1981. In this case the "thickness of the energy concentration" is restricted by the condition $$\delta<T/2\pi,$$

where T is a period of the considered slow-wave structure.

One or more types of slowed waves at one or different frequencies can be excited in the sensitive slow-wave structure simultaneously, their number being equal to the number of conductors minus 1, see Le Blond A., Mourier G. "L'etude des Lignes a bareux a structure periodique pour les tubes electroniques U.H.F." *Ann. Radioelektr.,* 1954, 9, #38, p. 311 or Z. I. Taranenko, Ya. K. Trochimenko "Slow-Wave Structures" [in Russian] *Kiev,* 1965, p.57. The more waves that are excited in the resonator 4, the more informative parameters can be obtained.

As was mentioned above, the slowed electromagnetic wave is excited in resonator 4 with distribution of the electric and magnetic components of the field required for the best sensitivity. Usually, the field distribution is defined by the slowing n and the frequency $f$. As it follows from theory, see L. N. Loshakov and Yu. N. Pchelnikov, "Theory and Amplification Calculation of Traveling-Wave Tube," *Moscow: Radio,* 1964, the electric and magnetic field distribution near the multi-pole 10 (near the resonator 4 surface facing the electrodynamic profile 1 in the present invention) can be changed as by slowing n change or by frequency $f$ change. Thus, one can obtain different distribution of the field in the same resonator, exciting, for example, two or more slowed waves at different frequencies, or exciting different modes (in-phase or anti-phase).

Figure 21:
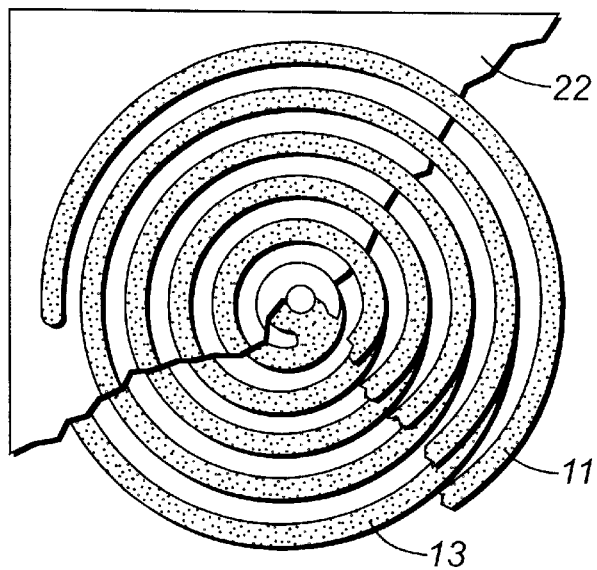
FIG. 21 illustrates coupled arithmetic spirals.

The field distribution can be changed essentially in so called coupled slow-wave structures (see V. V. Annenkov, Yu. N. Pchelnikov "Sensitive Elements Based on Slow-Wave Structures" *Measurement Techniques,* Vol 38, #12, 1995, pp. 1369–1375), which impedance conductors 11, 13 have configuration of turned through 180°, mirror images of one another, for example, oppositely directed radial spirals, shown in FIG. 21. Here impedance conductors 11, 13 with similar dimensions are placed on the opposite surfaces of a thin dielectric substrate 22. When an in-phase wave is excited in the coupled slow-wave structure, the electric field is shifted outside conductors 11 and 13 and the magnetic field is concentrated between these conductors as shown in FIG. 19. When anti-phase wave is excited in the same coupled slow-wave structure the electric energy concentrates between conductors 11, 13 and magnetic field concentrates outside these conductors as shown in FIG. 20.

The currents induced on the surface of the electrodynamic profile 1, for example on the metal coating 14, decrease the magnetic field and increase the electric field of the multipole 10, the first resulting in the slowing n decreasing, the second resulting in the slowing n increasing. Thus it is important to shift in the region 21 electric field only, or magnetic field only. This purpose may be achieved, as shown above, by anti-phase or in-phase wave exciting in the coupled slow-wave structures, or by screening the electric or magnetic field by the screen conductor 12 with anisotropy conductivity, see V. V. Annenkov, Yu. N. Pchelnikov "Sensitive Elements Based on Slow-Wave Structures" *Measurement Techniques*, Vol. 38, #12, 1995, pp. 1369–1375.

Figure 22:
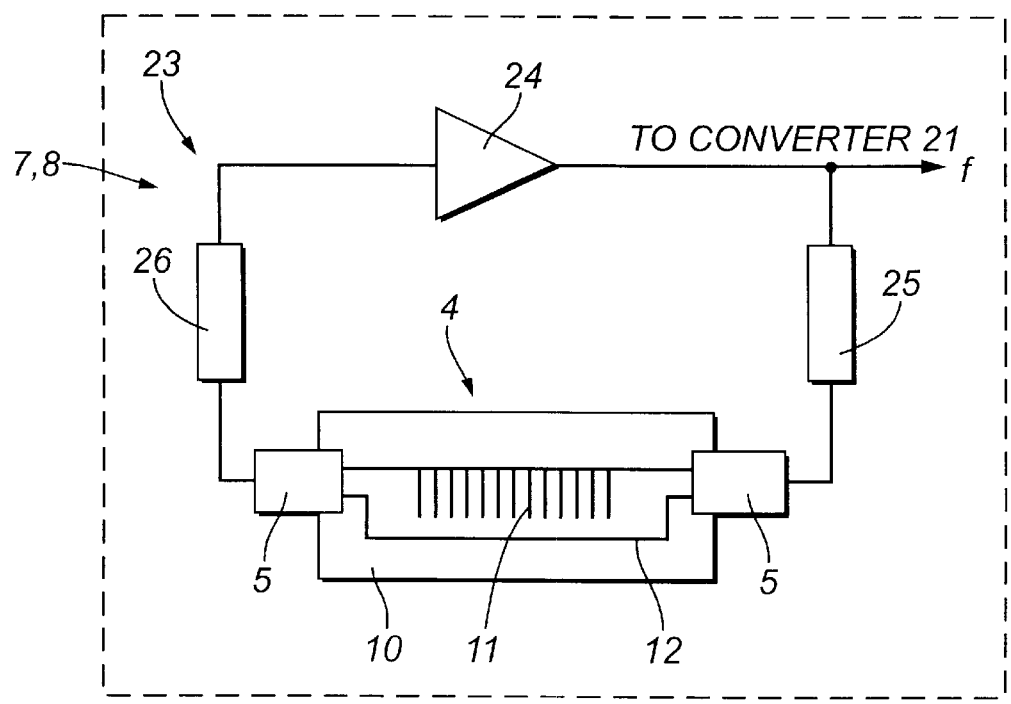
FIG. 22 illustrates the preferred circuit of the preferred embodiment of the present invention for the phase delay converting into a generator's frequency.

The variation of the slowing n in the multi-pole 10 can be converted into generator 7 frequency alternation $\Delta f$. This can be done by the resonator 4 serial connection in the feedback network 23 of amplifier 24 (FIG. 22). Filter circuits 25 and 26 in feedback 23 can be inserted to increase stability of the generator 7. In this case the generator 7 acts as a primary transducer 8, converting a phase delay variation into the frequency variation.

Figure 23:
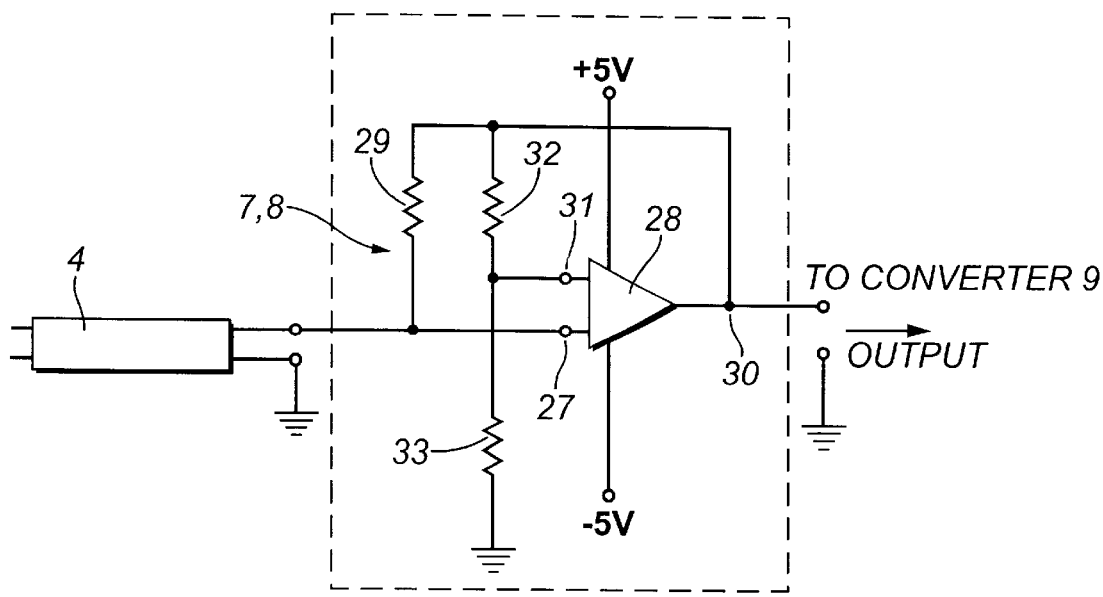
FIG. 23 illustrates the preferred circuit of the preferred embodiment of the present invention to confer alteration of a resonant frequency to a generator's frequency.

The resonator 4 resonance frequency $f_r$ depends on slowing n and other elements included in the resonator 4. The resonance frequency $f_r$ and its variation can be measured by a standard frequency meter or other devices. In transducers the resonance frequency can be converted in the generator 7 frequency $f_g$. It is convenient to use for this purpose the Schmitt trigger (see "The Penguin Dictionary of Electronics," second edition, p. 505). FIG. 23 shows the version of such generator. Here the resonator 4 is connected between the inverting input 27 of an operational amplifier 28 and the ground. Simultaneously, the inverting input 27 is connected through a resistance 29 to the output 30 of the amplifier 28, which non-inverting input 31 is connected through a resistance 32 to the output 30 and is connected through a resistance 33 to the ground. The signal from the output 30 has meander configuration with frequency near the resonance frequency of the resonator 4.

Figure 5:
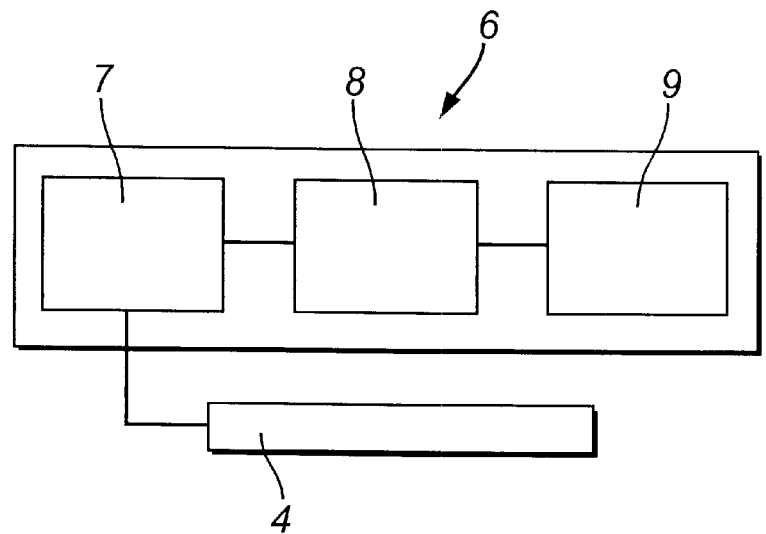
FIG. 5 illustrates the measuring circuit of the preferred embodiment of the present invention.

As discussed above, the apparatus for an angle displacement monitoring comprises the electrodynamic profile 1, mounted on the rotating part 2, and at least one resonator 4, connected to a measuring circuit 6 (FIGS. 1–4), the last including a generator 7 of electromagnetic oscillations, a transducer 8, connected to a converter 9, converting an electric signal to indicate the measured parameters, such as the angular position, velocity, the number of revolutions, etc. (FIG. 5).

The resonator 4 (FIG. 24) includes at least one multi-pole 10, and at least one matching plug 5. The multipole 10 is connected with one its end (end 34 in FIG. 24) to the matching plug 5, the other its end (end 35 in FIG. 24) can be free.

Figure 25:
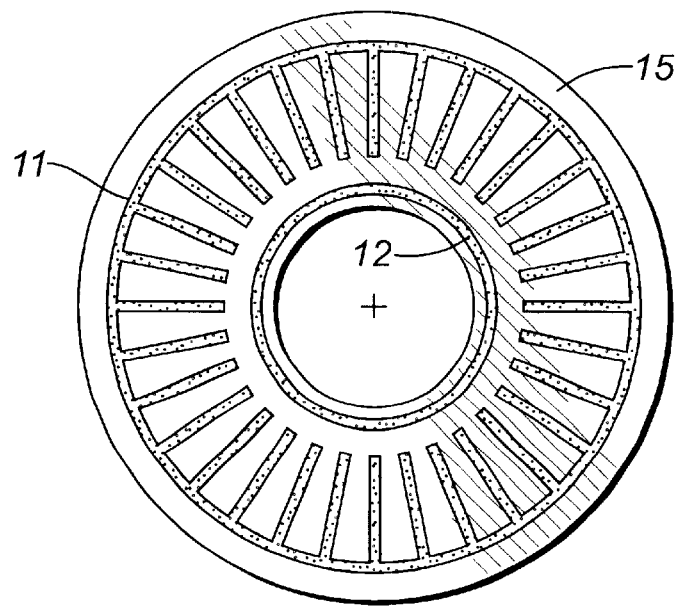
FIG. 25 illustrates a multi-pole of the preferred embodiment of the present invention, coiled into a ring.

In some cases, when, for example, small displacement is monitored, the maximum sensitivity has resonator with the multipole 10, curled into a ring (FIG. 25). In this case the multipole 10 has no ends and the matching plug 5 can be connected to the multi-pole 10 in any section.

Figure 26:
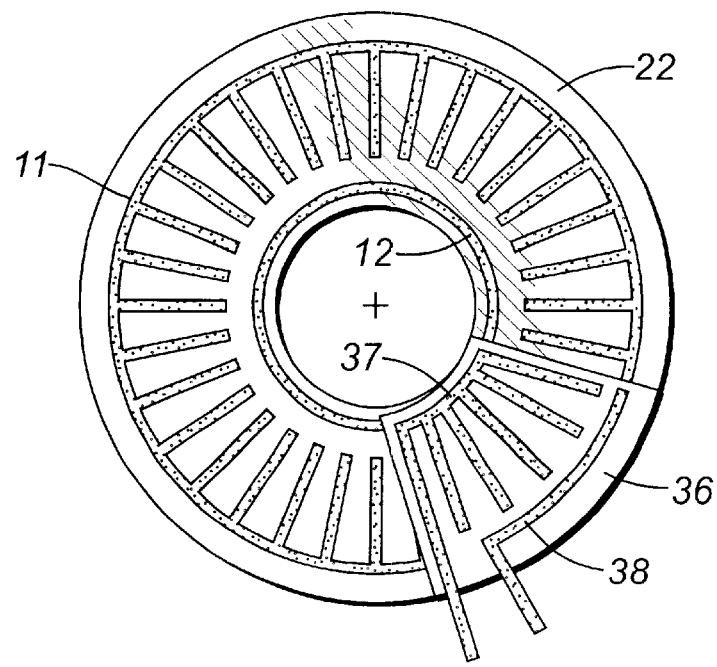
FIG. 26 illustrates a non-contact matching plug placed near the multi-pole of the preferred embodiment of the present invention.

The matching plug 5 can be made as a non-contacting device (loop, probe, etc.). The preferred embodiment of the non-contact plug 5 in the present invention is the section of a slow wave structure 36, which impedance conductor 37 configuration (FIG. 26) is a turned through 180° mirror image of the impedance conductor 11 of the multi-pole 10.

The screen conductor 38 of the slow-wave structure 36 can be made as a tape or a plate.

Figure 27:
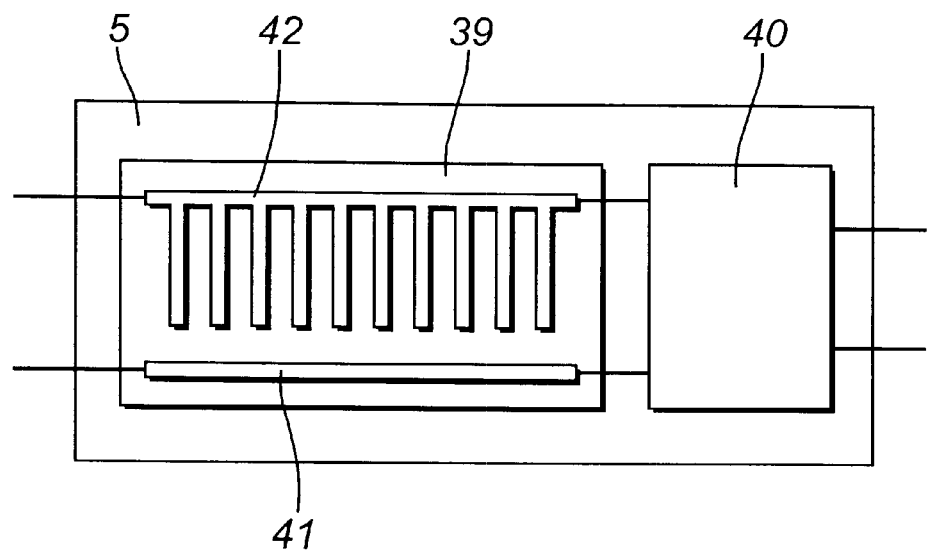
FIG. 27 shows a general scheme of a matching plug of the preferred embodiment of the present invention.
Figure 28:
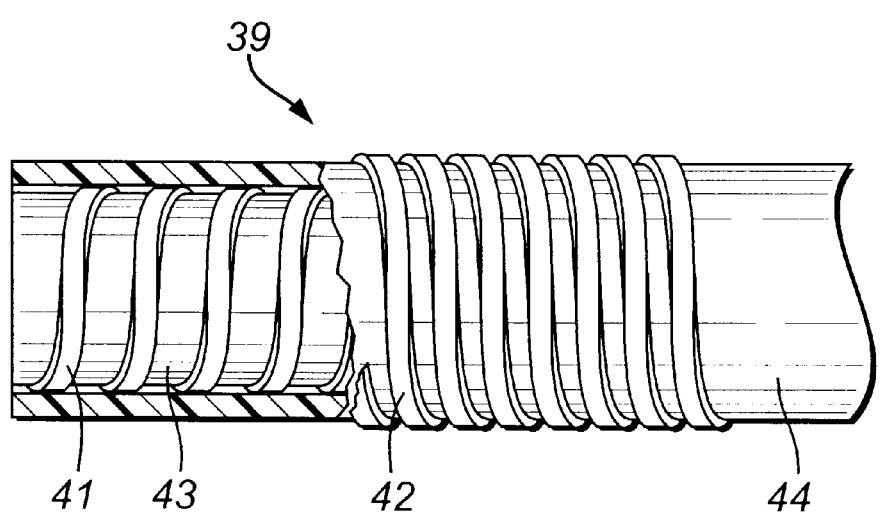
FIG. 28 shows the preferred embodiment of the present invention in which a transmission line of a matching plug is formed by coupled helices.

The preferred embodiment of the matching plug 5 of the present invention is the section of a two-conductor transmission line 39 (FIG. 27), The matching plug 5 may include also additional element 40 including capacitor or inductor or both of them (not shown in FIG. 27). The conductors 41 and 42 of the transmission line 39 may form a coupled slow-wave structure, for example coupled helices, shown in FIG. 28. Here conductor 41 is wound on a dielectric rod 43 and is isolated from conductor 42 by a thin dielectric tube 44.

Changing the parameters of the slow-wave structure 39 (diameter and pitch of impedance conductors 41, 42, the tube 44 thickness and its material permittivity) one can change the wave impedance $Z_1$ of the matching plug 5. As a rule, the wave impedance of the matching plug 5 should differ by at least three times (to exceed or to be less) from the wave impedance $Z_2$ of the multipole 10. It depends on multipole 10 loading. When multipole 10 is terminated to relatively large resistor or is open ended the wave impedance $Z_1$ should exeed the wave impedance $Z_2$, and contrary. It allows one to split electric and magnetic energy between the multipole 10 and the plug 5, and to decrease the sizes of the resonator 4, see Yu. N. Pchelnikov and A. A. Elizarov "Quasiresonators Using Slowing Down Systems" *Radioelectronics and Communications Systems*, Vol. 34, #10, 1991, pp. 68–72.)

Figure 29:
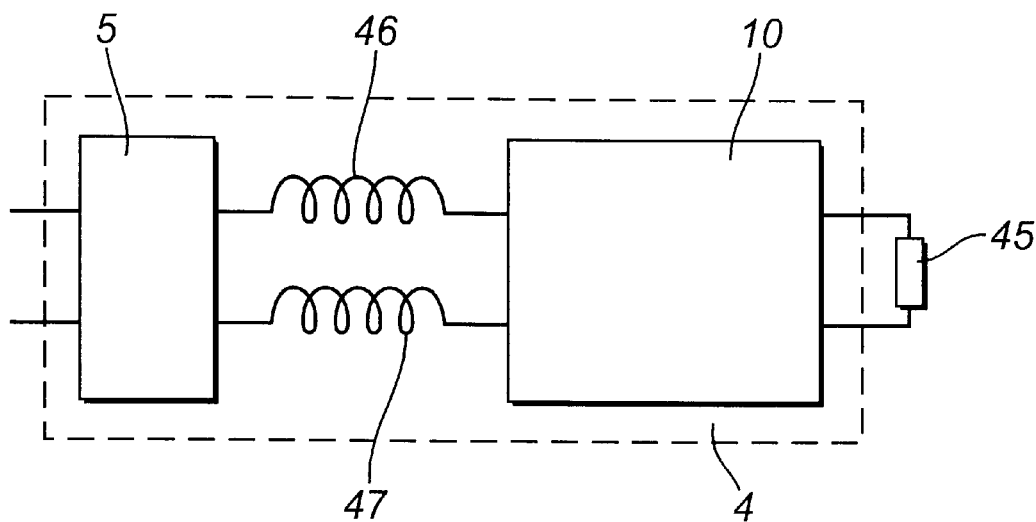
FIG. 29 illustrates a resonator wherein: a transmission line is replaced by two inductors.

If the resonator 4 is open ended or terminated to an inductor 45, as it is shown in FIG. 29, the slow-wave structure 39 may be replaced by two inductors 46 and 47.

Figure 30:
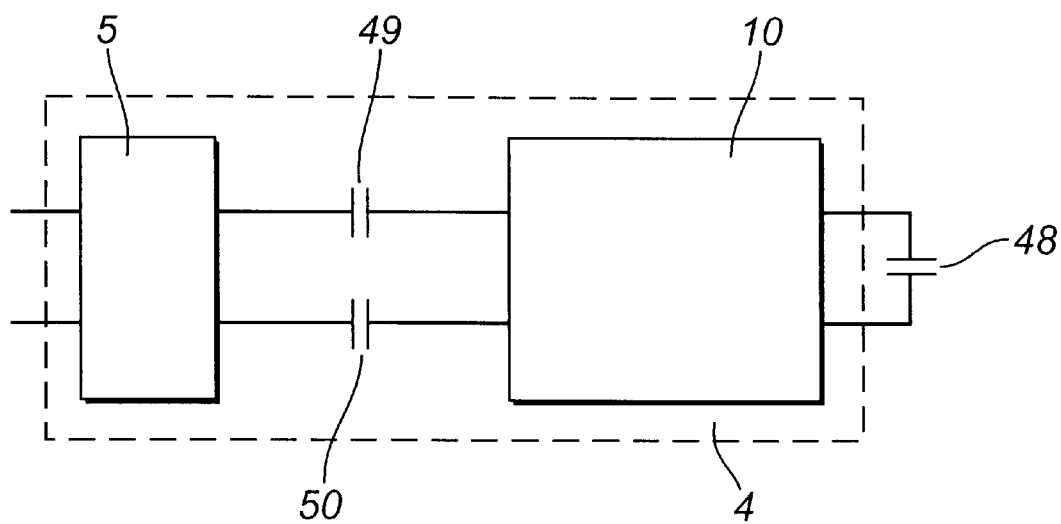
FIG. 30 illustrates an resonator wherein: a transmission line is replaced by two capacitors.

If the resonator 4 is short ended or terminated to a big capacitance 48, as shown in FIG. 30, the slow-wave structure 39 may be replaced by two capacitors 49, 50.

Figure 31:
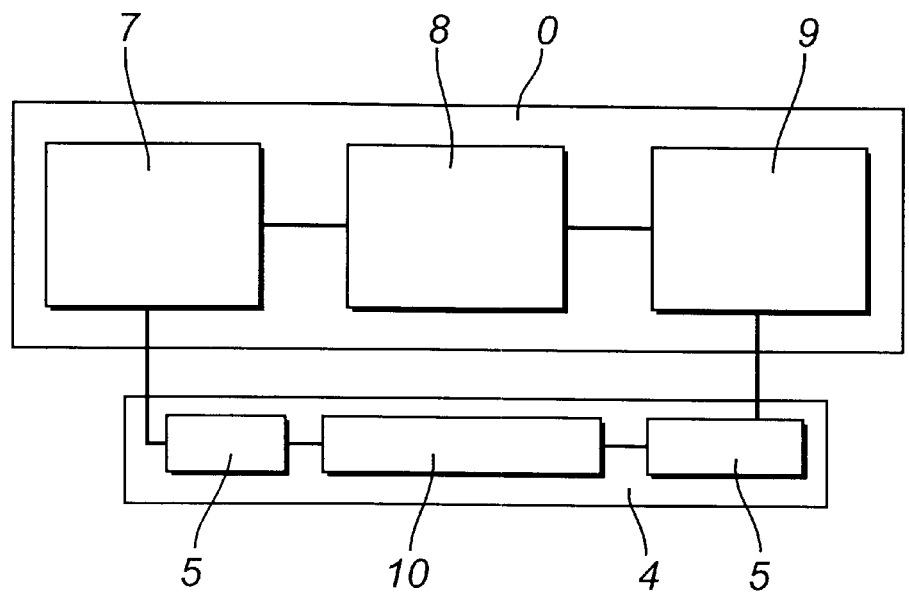
FIG. 31 shows the sequence connecting of the resonator into a measuring circuit.

When resonator 4 is connected to the measuring circuit 6 in sequence, the multi-pole 10 is connected to two identical or different plugs 5, as shown in FIG. 31.

Figure 32:
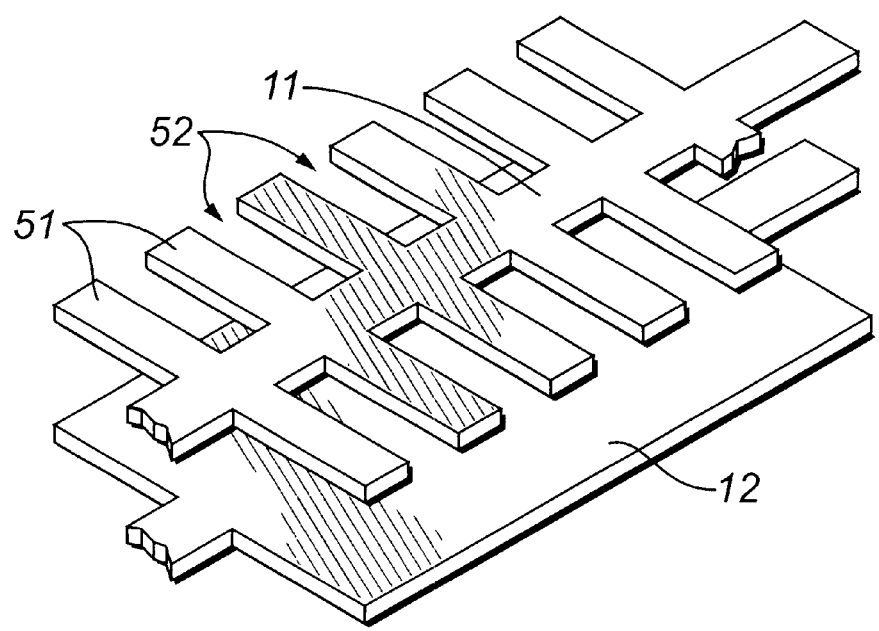
FIG. 32 illustrates a general model of the multi-pole in the present invention.

The multi-pole 10 includes at least one impedance conductor 11, fashioned as a row of conducting members 51 arranged in series in the direction of the slowed wave propagation and connected to one another with spacing 52, and a screen conductor 12, made as a tape, plate, cylinder, etc. (FIG. 32).

Figure 24:
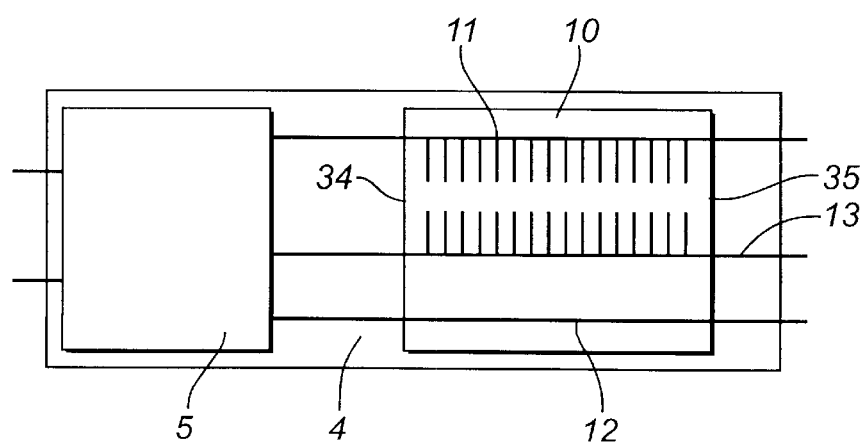
FIG. 24 is an illustration of the resonator of the preferred embodiment of the present invention.

Also, as discussed above, multi-pole 10 can include two or more impedance conductors (11, 13 in FIG. 24). The impedance conductors 11, 13 may lay on the same surface, forming, for example interdigital comb, shown in FIG. 9, or lay on the opposite surfaces of a dielectric plate, tube, etc., forming a coupled slow-wave structure.

The multipole 10 design (configuration and number of conductors) varies depending on the measurement to be done. If, for example, two waves should be excited, two impedance conductors 11, 13 and one screen conductor 12 should be in the multi-pole 10.

For relatively small angular displacement the impedance conductor 11 may form a meander line and the screen conductor 12 may form a tape, both curled into a ring and placed on opposite surfaces of a dielectric substrate 22 (FIG. 33). The electrodynamic profile 1 in this case may be formed by the coating 14 with configuration of a meander line with the same period T as the impedance conductor 11 (FIG. 11), or may have the configuration shown in FIG. 12 with the same period T. The maximum measured angular displacement $\phi$ in this case does not exceed T/4R, where R is the average radius of the meander line, forming the conductor 11.

The currents in the neighboring conductors of the meander line have opposite direction. If currents induced in the coating 14 by currents in the impedance conductor 11 form a closed ring, the magnetic field in the screen conductor will decrease, and, as a result, the slowing n will decrease also. The profile 1 displacement changes the amplitude of the currents induced in the coating 14, and can be monitored, for example, by the resonant frequency of the resonator 4 measurement. The same result can be achieved when both conductors of the multi-pole 10 are impedance conductors and form a coupled meander lines shown in FIG. 34. The profile 1 in this case may have the coating 14 on the dielectric body 15, shown in FIG. 12.

The preferred design of the multipole 10 for continuous monitoring of an angle displacement is shown in FIG. 35. Here multipole 10 comprises impedance conductors 11, 13, forming coupled spirals with segment configuration and placed on the opposite surfaces of the dielectric substrate 22, both having configuration of turned through 180° mirrow image. The profile 1 has metal coating 14 on a dielectric body 15, the coating 14 forming a symmetrical ring with a changing width w shown in FIG. 16.

When the profile 1 is made as coating 14 on the cylindrical surface of a dielectric body 15, the multi-pole 10 may be done as the segment (FIG. 36) or as a cylinder (FIG. 37).

What is claimed in this invention is:

1. A method for monitoring an angular displacement in a rotation plane about a rotation axis and related displacement parameters of a moving part, comprising:
   mounting at least one electrodynamic profile on the moving part;
   placing at least one resonator in proximity to said electrodynamic profile;
   exciting in said resonator an alternating electromagnetic field at a frequency at which the electromagnetic field penetrates into the electrodynamic profile;
   measuring the variation of the electromagnetic field parameters, caused by displacement of the electrodynamic profile,
   said exciting of said resonator is by an electromagnetic field in the form of at least one slowed electromagnetic wave having energy distribution of the electric and magnetic fields in said electrodynamic profile suitable for the maximum influence of its movement; and
   measuring of variation of the slowed electromagnetic wave parameters, and comparing said measured parameters.

2. The method of claim 1, wherein: the scalar angular displacement is measured.

3. The method according to claim 2, wherein: the scalar angular displacement exceeds 180°.

4. The method according to claim 2, wherein: the scalar measured angular displacement is continuous.

5. A method of claim 1, wherein said measuring step includes measuring of variation of the slowed electromagnetic wave parameters.

6. A method of claim 5, wherein said measuring step includes measured parameters.

7. The method according to claim 6, wherein: at least two said resonators are placed in the rotation plane at the same distance from and diametrically opposed to the rotation axis, and
   parameters of at least two slowed electromagnetic waves are measured and compared.

8. The method according to claim 6, wherein: there is included the step of converting results of said comparing into a representation of the angular displacement parameters.

9. The method according to claim 6, wherein: the angular displacement and its direction are monitored.

10. The method according claim 9, wherein:
    at least two resonators are placed with an angle shift in the rotation plane at the same distance from said electrodynamic profile, and
    parameters of at least two said slowed electromagnetic waves are measured and compared.

11. The method according to claim 10, wherein:
    said angular shift is equal to approximately 90°.

12. The method according to claim 10, wherein:
    at least two said resonators are placed in the rotation plane at the same distance from and diametrically opposed to the rotation axis.

13. The method according to claim 9, wherein:
    at least four said resonators are placed with 90° angular shift in the rotation plane at the same distance from said electrodynamic profile, and
    the slowed electromagnetic waves are excited in each of said resonators,
    the parameters of said slowed waves in each resonator are measured and compared.

14. The method according to claim 1, wherein:
    said slowed electromagnetic wave is an in-phase type of wave.

15. The method according to claim 1, wherein:
    said slowed electromagnetic wave is an anti-phase type of wave.

16. The method according to claim 1, wherein:
    the one slowed electromagnetic wave is an anti-phase type of wave, the other is an in-phase type of wave.

17. The method according to claim 1, wherein:
    the electric field of said slowed electromagnetic wave is presented nearby the electrodynamic profile by the zero space harmonic.

18. The method according to claim 1, wherein:
    the magnetic field of said slowed electromagnetic wave is presented nearby said electrodynamic profile by the zero space harmonic.

19. The method according to claim 1, wherein:
    the electric field of the slowed electromagnetic wave is presented nearby the electrodynamic profile by the plus one, minus one space harmonics.

20. The method according to claim 1, wherein:
    the magnetic field of the slowed electromagnetic wave is presented nearby the electrodynamic profile by the plus one, minus one space harmonics.

21. A method according to claim 1, wherein said slowed electromagnetic wave has an energy distribution of the electric and magnetic fields in said electrodynamic profile suitable for the maximum influence of its movements.

22. An apparatus for monitoring angular displacement in a rotation plane about a rotation axis of a moving part, comprising:
    at least one electrodynamic profile 1 for electric and magnetic fields mounted on the moving part 2 the displacement of the part 2 which is to be monitored,
    at least one resonator 4, including at least one matching plug 5, and a measuring circuit 6, including at least one radio frequency generator 7, at least one primary transducer 8 and a converter 9 converting and comparing electric signals into the parameter of angular displacement,
    said resonator including at least one section of a sensitive slow-wave structure set to distribute in a given ratio the components of an electric and magnetic fields in the electrodynamic profile, and connected to said matching plug;

said sensitive slow-wave structure further including at least two conductors, at least one of said conductors being an impedance conductor facing said electrodynamic profile.

23. The apparatus according to claim 22, wherein:

said slow-wave structure is fashioned as a row of conducting members arranged in series in the direction of the slowed wave propagation and connected to one another with spacing.

24. The apparatus according to claim 22, wherein:

said slow-wave structure forming a quadripole multi-pole.

25. An apparatus of claim 22, wherein said resonator includes at least one matching plug.

26. An apparatus of claim 25, wherein said section of a sensitive slow-wave structure is connected to said matching plug.

27. The apparatus according to claim 25, wherein:

said slow-wave structure forming a multi-pole.

28. The apparatus according to claim 27, wherein:

both ends of said multi-pole are connected one to another, said multi-pole forming a traveling wave resonator.

29. The apparatus according to claim 28, wherein:

said resonator is connected to the measuring circuit through one of said matching plugs.

30. The apparatus according to claim 27, wherein:

at least two of said conductors of said multi-pole are connected together on the end opposite to said matching plug.

31. An apparatus according to claim 27, wherein:

all conductors of said multi-pole are open ended on the end opposite to the said matching plug.

32. An apparatus according to claim 27, wherein:

at least two conductors of said multi-pole are terminated to a capacitor on the end opposite to the said matching plug.

33. An apparatus according to claim 27, wherein:

at least two conductors of said multi-pole are terminated to an inductor on the end opposite to the said matching plug.

34. An apparatus according to claim 27, wherein:

each of said electrodynamic profiles forms a round body, said body facing said multipole, and electromagnetic property of said body alters in the azimuth direction.

35. An apparatus according to claim 34, wherein:

said body has the altering in the azimuth direction radius.

36. An apparatus according to claim 34, wherein:

said body has the altering in the azimuth direction width.

37. An apparatus according to claim 34, wherein:

each of said electrodynamic profiles is formed by a conducting material.

38. An apparatus according to claim 34, wherein:

each of said electrodynamic profiles is formed by a dielectric material.

39. An apparatus according to claim 34, wherein:

each of said electrodynamic profiles is formed by a magnetic material.

40. An apparatus according to claim 34, wherein:

each of said electrodynamic profiles is formed by a metal coating on the dielectric ring.

41. An apparatus according to claim 40, wherein:

said metal coating forms a ring with alternating width.

42. An apparatus according to claim 40, wherein:

said metal coating forms a periodic in the azimuth direction row of conducting members, not connected one to another.

43. An apparatus according to claim 40, wherein:

said metal coating has a configuration of a meander line.

44. An apparatus according to claim 40, wherein:

said metal coating has a configuration of a regular comb.

45. An apparatus according to claim 40, wherein:

said metal coating has the form of a comb with inclined fingers.

46. An apparatus of claim 22, wherein said measuring circuit includes at least one frequency generator.

47. An apparatus of claim 46, wherein said frequency generator is a radio frequency generator.

48. An apparatus of claim 22, wherein said measuring circuit includes a transducer and a converter.

49. An apparatus of claim 22, wherein said distribution by said sensitive slow-wave structure is in a given ratio.

50. An apparatus of claim 22, wherein:

said slow-wave structure forming a multi-pole.

51. An apparatus according to claim 50, wherein:

said multi-pole comprising at least two impedance conductors placed in parallel and configured as mirror images of one another turned through 180°.

52. The apparatus according to claim 51, wherein:

said impedance conductors are made as radial spirals with opposite directions of winding.

53. The apparatus according to claim 51, wherein:

said impedance conductors are made as meander lines shifted one to another in the direction of the rotation on T/2, where T is the average period of a meander line.

54. An apparatus according to claim 50, wherein:

said multi-pole comprises two identical impedance conductors placed in the same surface.

55. An apparatus according to claim 54, wherein:

said impedance conductors form an interdigital comb.

56. An apparatus according to claim 50, wherein:

at least one surface of each of said electrodynamic profiles facing said multi-pole is placed perpendicularly to the rotation axis.

57. An apparatus according to claim 50, wherein:

at least one surface of each of said electrodynamic profiles facing said multi-pole is placed in parallel to the rotation axis.

58. An apparatus according to claim 22, wherein:

said impedance conductors are fashioned in the rotation plane.

59. An apparatus according to claim 22, wherein:

said impedance conductors are fashioned substantially in a manner of a cylindrical surface having an axis substantially coinciding with the rotation axis.

60. An apparatus according to claim 25, wherein:

said matching plug comprises at least one capacitor.

61. An apparatus according to claim 25, wherein:

said matching plug comprises at least one inductor.

62. An apparatus according to claim 25, wherein:

said matching plug includes a section of an additional two-conductor slow-wave structure.

63. An apparatus according to claim 62, wherein:

said additional slow-wave structure has the configuration of a coupled helix.

64. An apparatus according to claim 62, wherein:

said additional slow-wave structure has a wave impedance $Z_2$ which differs from the wave impedance $Z_1$ of said multi-pole by at least a factor of three.

65. An apparatus according to claim 25, wherein:

said resonator includes two said matching plugs connected to the measuring circuit in series.

66. An apparatus according to claim 25, wherein:

said resonator is connected to said measuring circuit through one of said matching plugs.

67. An apparatus according to claim 22, wherein:
at least one of said impedance conductors of said sensitive slow-wave structure has the configuration of a comb.

68. An apparatus according to claim 22, wherein:
at least one of said impedance conductors of said sensitive slow-wave structure has the configuration of a meander line.

69. An apparatus according to claim 22, wherein:
at least one of said impedance conductors of said sensitive slow-wave structure has the configuration of a radial spiral having a free outline with at least one axis of symmetry.

* * * * *